(12) United States Patent
Makulec et al.

(10) Patent No.: US 8,932,002 B2
(45) Date of Patent: Jan. 13, 2015

(54) AIR TURBINE STARTER

(75) Inventors: Jeffrey M. Makulec, Rockford, IL (US);
Matthew Slayter, Rockford, IL (US);
Dean A. Norem, Cherry Valley, IL (US);
Jody A. Peterson, Rockford, IL (US);
Brian Kent Rockwell, Rockford, IL (US); Matthew Gorajski, San Diego, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1076 days.

(21) Appl. No.: 12/960,029

(22) Filed: Dec. 3, 2010

(65) Prior Publication Data
US 2012/0141258 A1    Jun. 7, 2012

(51) Int. Cl.
*F01B 25/16* (2006.01)
*F01D 25/24* (2006.01)
*F01D 21/04* (2006.01)

(52) U.S. Cl.
CPC .............. *F01D 25/24* (2013.01); *F01D 21/045* (2013.01); *F05D 2220/34* (2013.01); *F05D 2260/37* (2013.01); *F05D 2260/85* (2013.01); *F05D 2300/518* (2013.01); *F05D 2300/614* (2013.01); *Y02T 50/671* (2013.01)
USPC .............................. 415/9; 415/196; 415/215.1

(58) Field of Classification Search
CPC ..................................................... F01D 21/045
USPC .......................... 415/9, 196, 214.1, 215.1, 220
See application file for complete search history.

(56) References Cited

U.S. PATENT DOCUMENTS

| | | | |
|---|---|---|---|
| 3,989,407 A | 11/1976 | Cunningham | |
| 4,013,376 A | 3/1977 | Bisson et al. | |
| 4,397,608 A | 8/1983 | Hussain et al. | |
| 4,547,122 A | 10/1985 | Leech | |
| 4,639,188 A | 1/1987 | Swadley | |
| 4,914,906 A | 4/1990 | Burch | |
| 4,955,192 A | 9/1990 | Shekleton | |
| 5,129,224 A | 7/1992 | Shekleton | |
| 5,271,220 A | 12/1993 | Holmes et al. | |
| 5,823,739 A | 10/1998 | Van Duyn | |
| 6,059,524 A | 5/2000 | Costa et al. | |
| 6,126,390 A | 10/2000 | Böck | |
| 6,179,551 B1 | 1/2001 | Sathianathan et al. | |
| 6,268,301 B1 | 7/2001 | Dalman et al. | |
| 6,533,541 B1 | 3/2003 | Farnsworth et al. | |
| 6,638,008 B2 | 10/2003 | Sathianathan et al. | |
| 6,681,579 B2 | 1/2004 | Lane et al. | |
| 6,769,864 B2 | 8/2004 | Sathianathan et al. | |
| 6,814,539 B2 | 11/2004 | Farnsworth et al. | |
| 7,229,247 B2 | 6/2007 | Durocher et al. | |
| 7,229,249 B2 | 6/2007 | Durocher et al. | |

(Continued)

FOREIGN PATENT DOCUMENTS

| | | | |
|---|---|---|---|
| EP | 0343412 A1 | 11/1989 | |
| EP | 1726804 A2 | 11/2006 | |
| WO | 03/048546 A1 | 6/2003 | |

*Primary Examiner* — Edward Look
*Assistant Examiner* — Adam W Brown
(74) *Attorney, Agent, or Firm* — Cantor Colburn LLP

(57) ABSTRACT

An air turbine starter is provided and includes a rotor including turbine blades, which is rotatable about a rotational axis, a housing including a portion thereof radially surrounding the turbine blades to define a pathway along which fluids flow to interact with the turbine blades and a containment ring affixed to an exterior of the portion of the housing radially surrounding the turbine blades.

18 Claims, 2 Drawing Sheets

(56) References Cited

U.S. PATENT DOCUMENTS

| | | |
|---|---|---|
| 7,232,289 B2 | 6/2007 | Dong et al. |
| 7,246,990 B2 | 7/2007 | Xie et al. |
| 7,334,980 B2 | 2/2008 | Trinks et al. |
| 7,338,250 B2 * | 3/2008 | Martindale et al. ............... 415/9 |
| 7,390,161 B2 | 6/2008 | Xie et al. |
| 7,513,734 B2 | 4/2009 | McMillan |
| 7,552,005 B2 | 6/2009 | Kim et al. |
| 7,713,021 B2 | 5/2010 | Finn et al. |
| 2003/0161721 A1 | 8/2003 | Farnsworth et al. |
| 2004/0234369 A1 | 11/2004 | Feest |
| 2006/0093847 A1 | 5/2006 | Hornick et al. |
| 2006/0201135 A1 | 9/2006 | Xie et al. |
| 2006/0257253 A1 | 11/2006 | Dong et al. |
| 2007/0081887 A1 | 4/2007 | Xie et al. |
| 2007/0280817 A1 | 12/2007 | Costa et al. |
| 2008/0145215 A1 | 6/2008 | Finn et al. |
| 2008/0199301 A1 * | 8/2008 | Cardarella, Jr. ................... 415/9 |
| 2009/0110538 A1 * | 4/2009 | Kostka et al. ..................... 415/9 |
| 2009/0175714 A1 * | 7/2009 | Cacace ............................. 415/9 |

\* cited by examiner

AIR TURBINE STARTER

BACKGROUND OF THE INVENTION

The subject matter disclosed herein relates to an air turbine starter and, more particularly, to an air turbine starter including a containment ring.

Aircraft engines, for example, gas turbines, are typically equipped with an air turbine starter (ATS) mounted on the engine accessory gearbox. The functional purpose of the ATS is to accelerate the engine up to a desired speed prior to ignition of the engine combustor and to continue assisting the engine start until the engine is capable of operating independently. The ATS is typically driven by pressurized air provided by an air source such as an auxiliary power unit, another operating engine, or an external air cart connected to the ATS. Pressurized air or gas fed into the ATS drives rotation of an ATS rotor causing rotation of a starter shaft. The starter shaft transmits this rotation to the drive shaft of the accessory gearbox. Rotation of the gearbox shaft drives rotation of a high pressure rotor of the engine which induces airflow into the engine and causes rotation of the engine high pressure rotor assembly. When the engine rotation reaches a desired speed, the ATS is turned off by stopping pressurized air flow.

A typical ATS has a turbine wheel with integral blades and a typical containment event is one where the entire turbine rim is shed in relatively large angular segments with the blades still attached. Containment events commonly occur because of some other system failure, which causes the turbine to become unloaded mechanically and go to free run speed. This generates excessive heat at the turbine bearings, which subsequently fail, and result in the turbine wheel translating axially. An area below the rim rubs against an adjacent stationary part, resulting in shedding of the rim. The blades themselves get rubbed down to some degree, transforming into smaller debris. These and/or other types of containment events must be considered when designing and building each ATS for aircraft engine and/or other uses.

To this end, one type of an ATS housing is known as softwall. A softwall is disposed within the ATS housing and includes multiple layers of a light weight penetration resistant fabric wrapped around a rigid but penetrable support ring. A containment event fragment will penetrate the support ring but be contained by the fabric. Softwall construction is expensive but light weight, a distinct advantage in an aircraft application. A second type of an ATS housing, known as hardwall, is disposed within the housing and includes a ring having sufficient radial thickness to resist penetration of a blade fragment. The choice of hardwall or softwall construction depends largely on the housing diameter. For a large diameter housing, hardwall construction is prohibitively heavy and therefore softwall construction, despite being expensive, is often employed. For a small diameter housing, the radial thickness required for penetration resistance imposes only a modest weight penalty and so the less expensive hardwall construction is usually employed.

Although hardwall construction is almost universally employed for small diameter housings, the thickness and rigidity of a hardwall often prevents ready deflection when struck by a fragment. Consequently, the full force of the impact is concentrated over a very short time interval and therefore may be quite damaging. The need to account for the abruptness and resultant severity of the impact contributes to the required thickness of the housing and therefore to its weight.

BRIEF DESCRIPTION OF THE INVENTION

According to one aspect of the invention, an air turbine starter is provided and includes a rotor including turbine blades, which is rotatable about a rotational axis, a housing including a portion thereof radially surrounding the turbine blades to define a pathway along which fluids flow to interact with the turbine blades and a containment ring affixed to an exterior of the portion of the housing radially surrounding the turbine blades.

According to another aspect of the invention, an air turbine starter is provided and includes a rotor including turbine blades, which is rotatable about a rotational axis, a housing to define a pathway along which fluids flow to interact with the turbine blades, the housing including an annular portion thereof radially surrounding the turbine blades from an axial position forward of to an axial position aft of the turbine blades and an annular containment ring affixed to an exterior facing surface of the portion of the housing radially surrounding the turbine blades.

According to yet another aspect of the invention, a containment ring for an air turbine starter is provided and is affixed to an exterior of a portion of a housing radially surrounding rotor turbine blades and formed of a material having a higher strength and/or a higher ductility than that of the housing.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
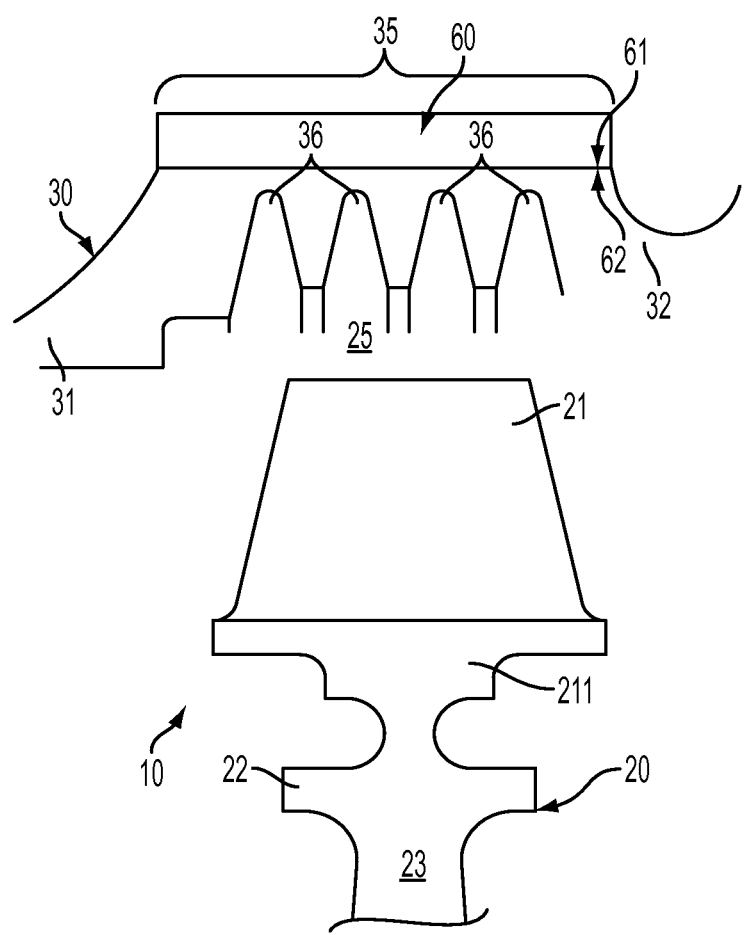
FIG. 1 is a side sectional view of an air turbine starter in accordance with embodiments.
Figure 2:
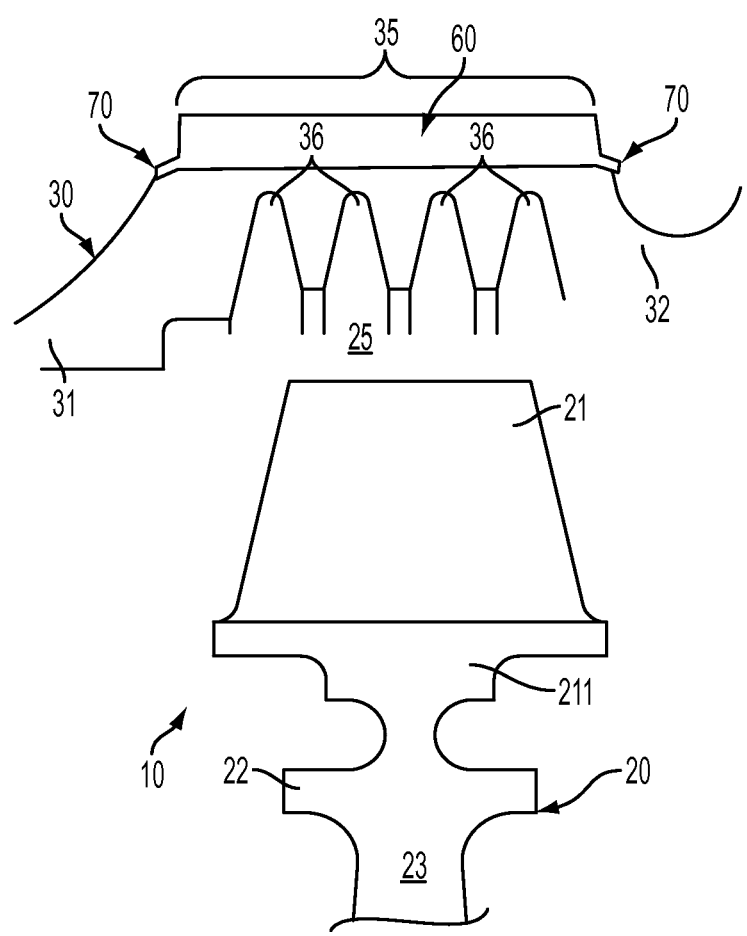
FIG. 2 is a side sectional view of an air turbine starter in accordance with further embodiments.

With reference to FIGS. 1 and 2, an air turbine starter 10 is provided and includes a rotor 20, a housing 30 and a containment ring 60. The rotor 20 includes single or multiple arrays of turbine blades 21, which are attached to and extend radially outwardly from a turbine platform 211, which itself is attached to and extends radially outwardly from a hub 22. During operation, each hub 22 and associated turbine blade 21 rotates about a longitudinally extending central rotational axis 23. The housing 30 is a non-rotating feature and circumscribes the tips of the turbine blades 21 and is radially spaced therefrom by a small amount. The housing 30 has a leading edge 31 and a trailing edge 32, at least one of which is connected to an adjacent starter gearbox housing, and defines the outer boundary of a flowpath 25 extending longitudinally. Fluids flow along the flowpath 25 to aerodynamically interact with the turbine blades 21.

The housing 30 further includes a substantially annular portion 35 thereof that radially surrounds the turbine blades 21 from an axial position generally forward of to an axial position generally aft of the turbine blades 21. In that position, during operation, the portion 35 of the housing 30 confines or contains certain fragments or projectiles ejected from the turbine blades 21, the turbine platform 211, the hub 22 and/or other similar features. In some cases, an interior facing surface of the portion 35 of the housing 30 is formed to define a circumferentially extending radial recess 36. The radial recess 36 is tapered and narrows at increasing radial distances from the hub 22 such that the fragments are deflected by the radial recess 36 and slowed. Their kinetic energy thereby decreased, damage caused by the fragments can be mitigated. The radial recess 36 may be plural in number with each radial recess 36 arrayed in-line along an axial length of the rotor 20.

Those fragments that are not confined or contained within the housing 30 may be confined or contained within the containment ring 60, which absorbs energy from fragments during failure/containment events. The containment ring 60 is affixed to an exterior facing surface of the portion 35 of the housing 30 such that the containment ring 60 radially surrounds the portion 35 of the housing 30 and the turbine blades 21 from an axial position forward of to an axial position aft of the turbine blades 21. Since the containment ring 60 is disposed at an exterior of the housing 30, the containment ring 60 and the housing 30 may be formed of different materials and the size and shape of the containment ring 60 is not delimited by the size and shape of the housing 30.

As shown in FIG. 1, the containment ring 60 may be substantially annular and may extend circumferentially and axially about the housing 30 and the turbine blades 21 but is structurally separate from the housing 30. In this way, the containment ring 60 and the housing 30 can be made of respective materials that are best suited for their respective purposes. In accordance with embodiments, the containment ring 60 may be formed of a material having a different strength to weight ratio than that of the housing 30. Also, the containment ring 60 may be formed of a material having a higher strength than that of the housing 30, a material having a higher ductility that that of the housing 30 and/or a material having a higher strength and a higher ductility that that of the housing 30. In particular, the containment ring 60 may include one or more of steel, nickel, nickel alloy or high-strength fiber, such as glass fiber, graphite fiber, carbon fiber, ceramic fiber and/or aromatic polyamid fiber. Where the containment ring 60 includes fiber, the containment ring 60 may further include a resin or, more particularly, a thermosetting polymeric resin, such as vinyl ester, polyester, acrylic, epoxy resin and/or polyurethane.

With the containment ring 60 affixed to the exterior of the portion 35 of the housing 30, the size and/or shape of the containment ring 60 is not limited by the size and/or shape of the housing 30. Similarly, the type of materials chosen for the containment ring 60 need not be the same or even similar to the materials chosen for the housing 30. Thus, a high strength, highly ductile material of the containment ring 60 can be employed for confinement/containment of fragments without substantially increasing the size, shape, weight and cost of the housing 30 or the air turbine starter 10. In addition, determination of the sizes and shapes of the housing 30 and the radial recesses 36 can be more easily controlled and, if necessary, varied.

The containment ring 60 may be affixed to the housing 30 via an interference fit occurring between mating surfaces 61, 62 at an interior diameter of the containment ring 60 and an exterior diameter of the housing 30, respectively. As such, additional separate fasteners, such as nut/bolt combinations, may be employed for structural purposes but are not required. In accordance with additional and/or alternate embodiments, as shown in FIG. 2, the air turbine starter 10 may include axial retention devices 70. The axial retention devices 70 are integrally connected to the containment ring 60 and may be formed by, for example, swaging or similar processes. The axial retention devices 70 axially retain the containment ring 60 relative to the housing 30. In still further embodiments, the containment ring 60 may be secured by way of o-rings formed of, for example, silicon-based materials, a wire ring threaded into a groove, external retaining rings, bolts, etc.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An air turbine starter, comprising:
a rotor including turbine blades, which is rotatable about a rotational axis;
a housing including a portion thereof radially surrounding the turbine blades to define a pathway along which fluids flow to interact with the turbine blades,
the portion of the housing having an axial length extending between a forward position defined forward of the turbine blades and an aft position defined aft of the turbine blades;
a containment ring affixed to an exterior of the portion of the housing radially surrounding the turbine blades, the containment ring extending along an entirety of the axial length of the portion of the housing, and
wherein the housing comprises a curved portion which is curved in an axial direction as viewed in a circumferential direction and substantially straight portions tapering away from one another and extending radially inwardly from the curved portion to define a circumferentially extending radial recess coaxial with and radially interposed between the containment ring and the turbine blades.

2. The air turbine starter according to claim 1, wherein the radial recess is plural in number with the plural radial recesses arrayed axially between the forward and aft positions.

3. The air turbine starter according to claim 1, wherein the containment ring comprises a material having a higher strength than that of the housing.

4. The air turbine starter according to claim 1, wherein the containment ring comprises a material having a higher ductility that that of the housing.

5. The air turbine starter according to claim 1, wherein the containment ring comprises a material having a higher strength and a higher ductility that that of the housing.

6. The air turbine starter according to claim 1, wherein the containment ring comprises one or more of steel, nickel or nickel alloy or high strength fiber.

7. The air turbine starter according to claim 1, wherein the containment ring is affixed to the housing via an interference fit.

8. The air turbine starter according to claim 1, further comprising axial retention devices to axially retain the containment ring relative to the housing.

9. An air turbine starter, comprising:
a rotor including turbine blades, which is rotatable about a rotational axis;
a housing to define a pathway along which fluids flow to interact with the turbine blades, the housing including an annular portion thereof radially surrounding the turbine blades from an axial position forward of to an axial position aft of the turbine blades;

an annular containment ring affixed to an exterior facing surface of the portion of the housing radially surrounding the turbine blades, the annular containment ring extending along an entire axial length of the annular portion of the housing from the axial position forward of to the axial position aft of the turbine blades, and wherein the housing comprises a curved portion which is curved in an axial direction as viewed in a circumferential direction and substantially straight portions tapering away from one another and extending radially inwardly from the curved portion to define a circumferentially extending radial recess coaxial with and radially interposed between the containment ring and the turbine blades, the radial recess being plural in number with the plural radial recesses arrayed axially between the axial positions forward and aft of the turbine blades.

10. The air turbine starter according to claim 9, wherein the containment ring comprises a material having a higher strength than that of the housing.

11. The air turbine starter according to claim 9, wherein the containment ring comprises a material having a higher ductility that that of the housing.

12. The air turbine starter according to claim 9, wherein the containment ring comprises a material having a higher strength and a higher ductility that that of the housing.

13. The air turbine starter according to claim 9, wherein the containment ring comprises one or more of steel, nickel or nickel alloy.

14. The air turbine starter according to claim 9, wherein the containment ring is affixed to the housing via an interference fit.

15. The air turbine starter according to claim 9, further comprising axial retention devices to axially retain the containment ring relative to the housing.

16. A containment ring for an air turbine starter affixed to an exterior of a portion of a housing radially surrounding rotor turbine blades, with an interior of the portion of the housing defining plural, axially arrayed radial recesses, such that the containment ring extends along an entire axial length of the portion of the housing, surrounds the turbine blades and the radial recesses and is formed of a material having a higher strength and/or a higher ductility than that of the housing, and wherein the housing comprises a curved portion which is curved in an axial direction as viewed in a circumferential direction and substantially straight portions tapering away from one another and extending radially inwardly from the curved portion to define a circumferentially extending radial recess coaxial with and radially interposed between the containment ring and the turbine blades, the radial recess being plural in number with the plural radial recesses arrayed axially between the axial positions forward and aft of the turbine blades.

17. The containment ring according to claim 16, wherein the containment ring comprises one or more of steel, nickel or nickel alloy.

18. The containment ring according to claim 16, wherein the containment ring is annular.

\* \* \* \* \*